United States Patent [19]

Patenaude

[11] Patent Number: 4,691,691
[45] Date of Patent: Sep. 8, 1987

[54] GAS POWERED SOLDERING IRON

[76] Inventor: Jean-Pierre Patenaude, 104 Guigues Street, Ottawa, Ontario, K1N 5H7, Canada

[21] Appl. No.: 758,605

[22] Filed: Jul. 24, 1985

[30] Foreign Application Priority Data

Jun. 26, 1985 [CA] Canada ................................. 485355

[51] Int. Cl.⁴ ................................................. B23K 3/02
[52] U.S. Cl. .................................... 126/414; 126/413; 431/255; 431/256
[58] Field of Search .............. 126/414, 413, 409, 406, 126/407, 238, 239, 233; 431/255, 256, 344, 354, 355

[56] References Cited

U.S. PATENT DOCUMENTS

| 317,489 | 5/1885 | Baumeister | 126/414 |
|---|---|---|---|
| 382,558 | 5/1888 | Schlumberger | 126/414 |
| 813,374 | 2/1906 | Gilbert | 126/414 |
| 1,533,024 | 4/1925 | Miller | 126/414 |
| 4,119,088 | 10/1978 | Sim | 126/413 |
| 4,248,208 | 2/1981 | Diederich | 126/409 |
| 4,502,465 | 3/1985 | Yoshinaga et al. | 126/409 |
| 4,552,124 | 11/1985 | Nakajima | 126/413 |

FOREIGN PATENT DOCUMENTS 2732365  3/1977  Fed. Rep. of Germany ...... 126/414

Primary Examiner—Randall L. Green
Attorney, Agent, or Firm—Jones, Tullar & Cooper

[57] ABSTRACT

The specification describes a fuel powered soldering iron which includes a self-contained spark generating means. The spark generator, operated by a push-button switch on the body of the soldering iron, is activated in synchronism with a fuel-flow control valve. Thus, the soldering iron element, adapted to be heated by a combustor which burns in the presence of an air-fuel mixture, is made operational by activating the push-button switch.

11 Claims, 5 Drawing Figures

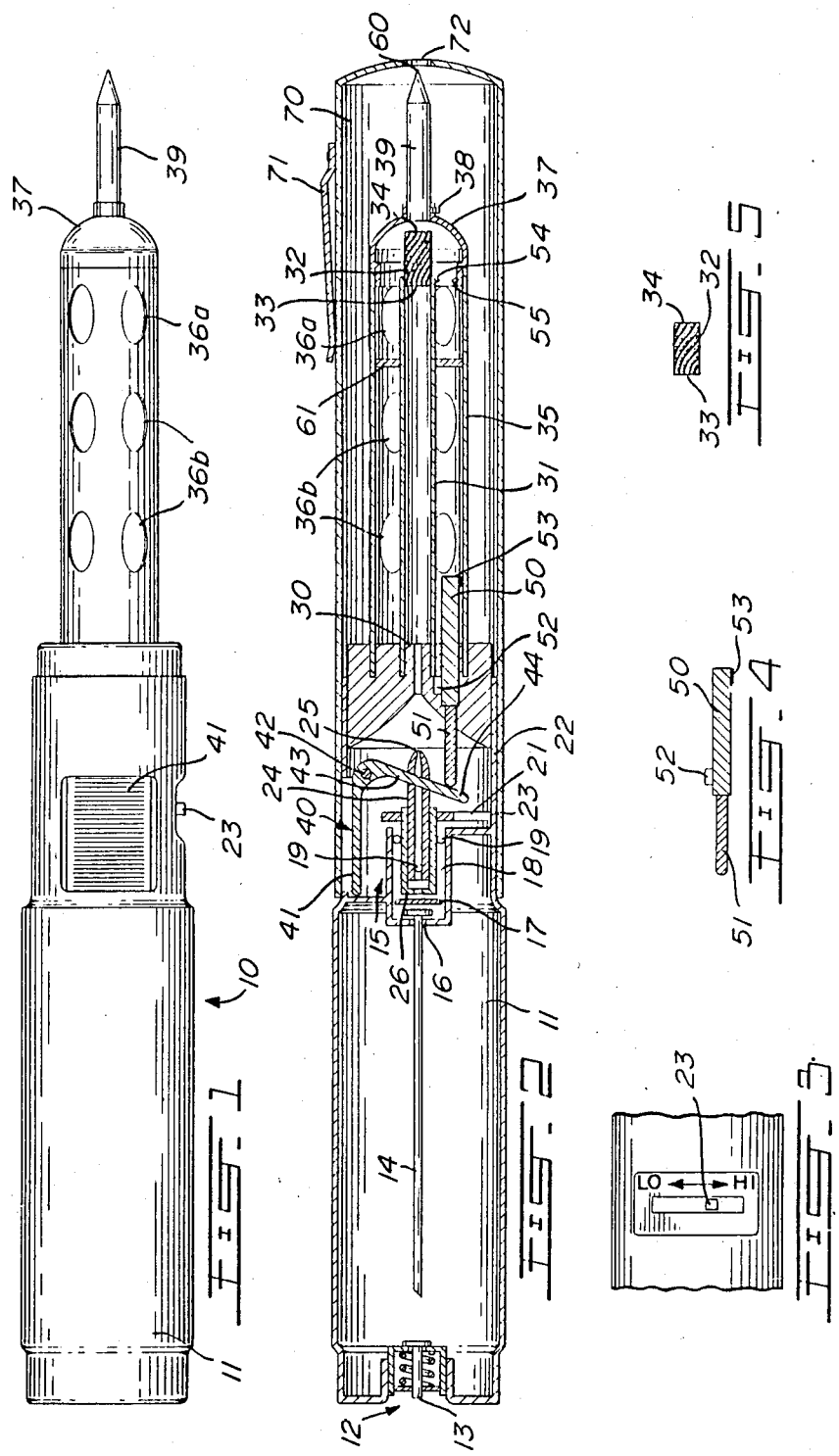

GAS POWERED SOLDERING IRON

BACKGROUND OF THE INVENTION

The present invention relates to a gas powered, pencil-shaped, soldering iron suitable for positioning in a pocket of an article of clothing, and wherein the soldering iron is provided with an "on-off" switch so that the iron is only turned on when desired, thereby reducing greatly the quantity of fuel used.

In the present application, applicant provides a stainless steel combustor which provides an almost instant source of heat, an on-off switch which initiates fuel flow and an instantaneous spark at the combustor. As a result the soldering iron element is heated only while the switch is in the on position. This feature renders the soldering iron more versatile and efficient.

SUMMARY OF THE INVENTION

According to the present invention, therefore, there is provided a gas-powered soldering iron which includes a reservoir for liquid fuel, a control valve with external regulator which permits adjustment of the fuel flow from the reservoir, a vaporizer, nozzle and venturi which vaporize the liquid fuel and mixes it with air to form an air-fuel mixture, a stainless steel combustor, a transfer tube between the venturi and combustor to transport the air-fuel mixture to the combustor, an on-off switch which has dual roles namely to start and stop fuel flow from the reservoir and to cause a spark to be generated in the combustor zone, and a solder element in juxtaposition to the combustor adapted to be heated thereby after ignition.

BRIEF DESCRIPTION OF THE DRAWINGS

The soldering iron of the present invention will now be described in more detail with reference to the appended drawings wherein:

FIG. 1 is a perspective view of a preferred embodiment.

FIG. 2 is a cross sectional view of the soldering iron of FIG. 1.

FIG. 3 illustrates the flow control lever.

FIG. 4 illustrates a piezzo-electric spark element and;

FIG. 5 illustrates a combustor.

DESCRIPTION OF PREFERRED EMBODIMENT

Referring now to FIG. 1, the soldering iron shown generally at 10 includes a reservoir 11 which as shown more clearly in FIG. 2 is a hollow cylinder having filler opening 12. The opening 12 includes a spring loaded one-way valve 13 which permits entry of fuel by means of a standard fuel cartridge as employed in filling cigarette lighters and the like. Fuel, such as butane, in liquid form is contemplated.

Within reservoir 11 is a wick 14 which carries the liquid fuel to the vaporizer and control valve shown generally at 15. Fuel conducted along wick 14 exits the reservoir 11 at opening 16. Compressable disc 17, part of the vaporizer assembly, is free to move longitudinally in column 18. Fuel in liquid state is turned into vapor as it enters the vaporizer assembly. Regulator tube 19 is contained within column 18 and free to move longitudinally therein. O-Ring seal 20 prevents fuel from escaping from the regulator tube. Control valve handle 21 projects laterally from the regulator tube 19 to the outside of the soldering iron body 22 as may be seen at 23 in FIG. 3.

Nozzle assembly 24 is contained within regulator tube 19. Opening 25 in nozzle assembly is in the order of 0.001–0.003 inches in diameter and serves to limit the fuel which is in gaseous forms exiting therefrom.

The effect of turning control 23 from "Lo" to "Hi" is to cause regulator tube 19 to move outwardly so that end 26 which is in contact with disc 17 moves away to permit more fuel to flow into the tube. Conversely moving the control from "Hi" to "Lo" brings tube end 26 back into contact with disc 17 so as to slow down fuel flow. More or less pressure of tube end 26 on disc 17 allows more or less fuel to flow. Obviously, the control may be set between "Hi" and "Lo" to provide an intermediate fuel flow. Vaporized fuel exiting opening 25 in nozzle assembly 24 is directed to venturi 30. As the fuel flows through the venturi air is drawn into the fuel stream and mixed therewith. The fuel-air mixture flows along transfer tube 31 and through stainless steel cumbustor 32. Stainless steel combustor 32 is constructed of a mesh or screen in a thimble shape. Open end 33 is within transfer tube 31 and closed end 34 projects beyond the tube. Housing 35, surrounds the transfer tube 31 leaving a gap therebetween. Openings 36 are formed in the housing.

Attached to housing 35 is a cone-shaped end cap 37. As shown in FIG. 2 the end cap fits inside the housing and is retained by means of a friction fit. Obviously other methods of attachment are contemplated. Coupled to end cap 37 is soldering element 39. As illustrated the soldering element is an elongated cylindrical component having a pointed or chisel shaped end. Other structures as known in the art are contemplated by this invention. The element is preferrably made of a copper-chrome alloy and nickel plated. The soldering element may be threaded into end cap 37 or retained by means of a set screw as illustrated at 38 in FIG. 2.

On-off switch shown generally as 40 in FIG. 2 comprises push button 41 located in the wall of the soldering iron. The button 41 pivoted at 42 is connected to arm 43 which is attached to nozzle assembly 24 at 44. Nozzle assembly 24 is baised toward end 26 of contact tube 19 by spring means (not shown) within the control tube. Thus in the normal position or off position nozzle assembly 24 is forced against end 26 of control tube 19 thus preventing fuel from flowing through nozzle tip 25. Depressing push botton 41 causes the arm 43 to pivot about 42 and raise nozzle assembly 24 through attachment 44. Thus, fuel flows through the nozzle 25 into venturi 30 where it is mixed with air and delivered to cumbustor 32.

Activation of push botton 41 also causes arm 44 to apply pressure to the piezzo-electric elements 50 and specifically on arm 51 thereof. As can be seen in FIG. 2, element 50 is connected electrically to transfer tube 31 at point 52 and to housing 35 at point 53. Since both the tube 31 and housing 35 are metallic the charge created by activation of the piezzo-electric element 50 is conducted to spark electrode 54 on the transfer tube and spark electrode 55 on the housing 35. A spark is created which ignites the fuel-air mixture flowing within the transfer tube to the combustor 32. Almost instantaneously, the combustor burns in the presence of the mixture resulting in instant heat generated by the combustor. This heat is transferred radiantly to soldering element 39 which having a low mass and high heat conducting capacity is rapidly heated at the tip 60. The element 39 will remain heated as long as push button 41 is depressed. Releasing the push button will permit nozzle assembly 24 to return to the off position thereby cutting off fuel flow to the combustor.

Exhaust gases generated at the combustor exit the housing through openings 36a. Arrestor 61 prevents the hot gases from flowing back toward the venturi 30. Openings 36b permit cooling air to enter the housing thus promoting "cool down" of the iron after use. Cap 70 is designed to fit over the housing so as to enclose the end cap 37 and element 39. The cap 70 also protects regulator 23 and push button 41 so that accidental activation of the iron is avoided. Clip 71 attached to the cap 70 permits the iron to be carried and retained in a shirt or jacket pocket. Opening 72 in the end of cap 70 allows for continued circulation of cooling air after the cap is installed.

In operation, the fuel reservoir is filled in a manner known in the art. Cap 70 is removed and push button 41 is depressed. Air-fuel mixture (at a flow rate previously set by control valve 23) flows to combustor 32 along transfer tube 31. At the same time the piezzo-electric element 50 is activated causing a spark between electrodes 54 and 55. The spark ignites the fuel-air mixture which causes combustor 32 to burn. Heat from combustor 32 heat element 39 so that tip 60 may be used for a soldering operation. As long as the push button is maintained in a depressed condition fuel will flow and heat will be generated.

Releasing the push button will cut-off the fuel flow causing the combustor to extinguish. The element 39 "cools off" rapidly. To commence a second soldering operation the push button is again depressed and held in that position as long as heat is required.

Obviously since the element is heated only when required a substantial saving in fuel is realized.

The appended drawings illustrate a preferred embodiment of the soldering iron according to the present invention. Obviously, changes in form and style are possible and contemplated within the scope of this invention.

For example, it is contemplated that a heat sensor, such as a bimetallic strip, be incorporated in the housing so as to be activated by heat generated at the combustor. The sensor, as known in the art, could be used to control fuel flow and hence regulate, automatically, the soldering element tip temperature.

The embodiments of the invention in which an exclusive property or privilege is claimed are defined as follows:

1. A gas powered, pencil-shaped, soldering iron suitable for positioning in a pocket of an article of clothing comprising a reservoir for liquid fuel, a housing attached to said reservoir including a control valve device adapted to regulate fuel flow from the reservoir, said control valve device having vaporizing means and a nozzle to conduct a regulated amount of pressurized fuel to an input side of a venturi adapted to vaporize and mix said fuel with air to produce a fuel-air mixture, a transfer tube secured to an output side of said venturi, a stainless steel combustor adapted to maintain combustion in the presence of said fuel-air mixture and secured at a combustor end of the transfer tube remote from said venturi, an "on-off" switch adapted to activate fuel flow through said nozzle of said control valve device whereby to initiate and terminate fuel flow from said reservoir to said venturi, a spark generating means simultaneously activated by switching on said switch to initiate an ignition spark in said combustor end, spark electrode means connected to both said transfer tube and an outside shield, respectively, to form a spark gap said spark generating means producing a high voltage which is transmitted by said transfer tube to said spark electrode, which is positioned adjacent said combustor, and a soldering element positioned forwardly of said combustor so as to be heated by said combustor when burning in the presence of said fuel-air mixture.

2. The soldering iron of claim 1 wherein said spark generating means is a piezzo-electric element.

3. The soldering iron of claim 1 further including a removable cap retained over said housing to protect said soldering element, said cap having a securing clip to retain said soldering iron in said pocket of said article of clothing.

4. The soldering iron claim 3 wherein said removable cap covers said on-off switch when said cap is installed on said iron.

5. The soldering iron of claim 1 wherein said stainless steel combustor is a wire mesh.

6. The soldering iron of claim 1 wherein said housing is of a low heat conducting material.

7. The soldering iron of claim 6 wherein said housing is of high heat resistant material.

8. The soldering iron of claim 6 wherein said housing is made of stainless steel.

9. The soldering iron of claim 1 wherein the transfer tube is of high heat resistant material.

10. The soldering iron of claim 9 wherein said transfer tube is of low heat conducting material.

11. The soldering iron of claim 1 wherein said "on-off" switch is a push button pivoted switch element secured to a pivot connected to said housing, said switch element having a connecting arm secured to said nozzle and spring biased to prevent fuel flow when in the "off" position, said connecting arm being adapted to contact and operate said spark generating means when placed to its "on" position while simultaneously causing the flow of regulated fuel through said nozzle.

* * * * *